United States Patent [19]

Tremblay

[11] Patent Number: 4,596,303

[45] Date of Patent: Jun. 24, 1986

[54] ANTI-THEFT DEVICE FOR MOTOR VEHICLES

[76] Inventor: Theodore Tremblay, 7 Page Rd., Bedford, Mass. 01730

[21] Appl. No.: 605,794

[22] Filed: May 1, 1984

[51] Int. Cl.[4] .............................................. B60R 25/02
[52] U.S. Cl. ..................................... 180/287; 70/252
[58] Field of Search ................. 70/185, 186, 238, 252; 180/271, 287

[56] References Cited

U.S. PATENT DOCUMENTS

| | | | |
|---|---|---|---|
| 3,648,490 | 3/1972 | Kimberlin et al. | 70/252 X |
| 3,685,606 | 8/1972 | Blow, Jr. | 180/287 |
| 3,703,092 | 11/1972 | Elliott | 70/252 X |
| 3,850,260 | 11/1974 | Obermeit | 180/287 |
| 4,004,273 | 1/1977 | Kalogerson | 340/64 |
| 4,084,657 | 4/1978 | Bradley et al. | 70/242 X |
| 4,107,962 | 8/1978 | MacKinnon | 70/243 |
| 4,232,538 | 11/1980 | Detloff, Jr. | 70/252 X |
| 4,258,560 | 3/1981 | Jessop | 180/287 X |
| 4,270,624 | 6/1981 | Jessop | 180/287 |
| 4,380,752 | 4/1983 | Reynolds | 340/52 D |

Primary Examiner—John J. Love
Assistant Examiner—Michael Mar
Attorney, Agent, or Firm—Hamilton, Brook, Smith & Reynolds

[57] ABSTRACT

An anti-theft system for a motor vehicle which comprises a key lock 20 connected to an ignition control switch 22 for locking the ignition control switch in an engine idle position with the motor vehicle engine running. The vehicle steering 14 and transmission 15 mechanisms are also locked when the ignition control switch is in the idle position and the key is removed. The anti-theft system also comprises a theft prevention system activation switch 64 having open and closed positions which is electrically connected to the vehicle's ignition system 70 and a second switch 60 which is selectively connected to ground. The theft prevention system activation switch 64 and the transmission linkage mechanism 18 are connected to the second switch 60 such that when the transmission is connected to the engine the second switch closes to complete a circuit path between ground 61 and the theft prevention system activation switch 64. Therefore when the theft prevention system activation switch 64 is in the closed position and the transmission is connected to the motor the ignition system 70 is connected to ground. The theft prevention system can also be modified for use with the fuel cut valve 159 of diesel vehicles.

14 Claims, 10 Drawing Figures

ANTI-THEFT DEVICE FOR MOTOR VEHICLES

TECHNICAL FIELD

This invention relates to motor vehicle anti-theft devices and in particular this invention permits vehicles to be left running, unattended, without fear of theft.

BACKGROUND OF THE INVENTION

Many motor vehicle thefts occur when vehicles are left running and unattended. Although vehicles should be shut off and locked when unattended, this is not always possible, particularly for emergency vehicles and vehicles used in extremely cold climates.

Ambulances are frequently left unattended at emergency call locations while ambulance personnel care for the injured. Since many drugs and blood supplies need to be refrigerated at constant temperatures, ambulance refrigerators are run continuously. Ambulance engines are, therefore, often left running during emergency calls to supply power to the refrigerators.

Vehicles used in very cold climates frequently require continuous heating to prevent damaging engine freeze-ups when outdoor temperatures are below 0° F. Further, very cold engines are difficult to start and, when started, are susceptible to engine damage. In order to avoid this problem, vehicles in some northern states are commonly indoor-garaged or equipped with electric engine block heaters. Where neither a garage nor an electrical outlet is available, residents of these areas are forced to leave their vehicles running and risk theft.

Diesel engine vehicles are particularly susceptible to cold weather problems. The fuel oil used by these vehicles thickens at temperatures below 20° F. This makes it difficult to achieve sufficiently high compression to start diesel vehicles in cold weather unless they are equipped with engine block and fuel line heaters. For this reason and because diesel vehicles are very fuel efficient at idle, many diesel vehicles are left running almost constantly in winter. As a result, trucks with valuable cargo often risk losses due to theft in winter.

A need therefore exists for an anti-theft system which permits vehicle engine operation while preventing theft.

SUMMARY OF THE INVENTION

The invention comprises an anti-theft system for motor vehicles wherein a vehicle ignition key switch has engine off, start, run and idle positions. A steering lock mechanism locks the steering wheel and a transmission lock mechanism locks the transmission when the vehicle ignition switch is in the idle position and the key is removed.

In a preferred embodiment of the invention, the anti-theft system also comprises a theft prevention engine ground out system. An activation switch which is used to activate the system is controlled either manually by the vehicle operator, or automatically by the ignition key switch. If the anti-theft ground out system is activated, the vehicle ignition system is electrically connected to a ground out switch.

The ground out switch is coupled to the transmission linkage on automatic transmission vehicles. When the transmission is engaged, i.e., moved out of the park position, the ground out switch closes and completes a circuit between the vehicle ignition system switch and ground, in order to shut off the engine and disable the vehicle, when the theft prevention system is activated.

In vehicles having standard transmissions, the ground out switch, rather than being attached to the transmission linkage, is attached to a clutch control linkage so that movement of the clutch closes the ground out switch. Movement of the clutch therefore disables the vehicle when the anti-theft system is activated.

In a preferred embodiment of the invention, a voltage limiter is provided in the anti-theft circuit, between the vehicle ignition system and ground, in order to protect the ignition systems from large, potentially damaging voltage changes.

In an embodiment of the invention suitable for diesel vehicles the idle position is used to activate a special shut off switch which controls a fuel shut off valve. The shut off switch is attached to the clutch or automatic transmission linkage in a manner similar to the ground out switch of the ground out anti-theft system. The shut off switch deactivates the fuel shut off valve which interrupts the fuel flow to the engine when the clutch or transmission is moved while the ignition is in the idle position.

BRIEF DESCRIPTION OF THE DRAWINGS

The foregoing and other features and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed on illustrating the principles of the invention.

DESCRIPTION OF THE PREFERRED EMBODIMENTS

Figure 1:
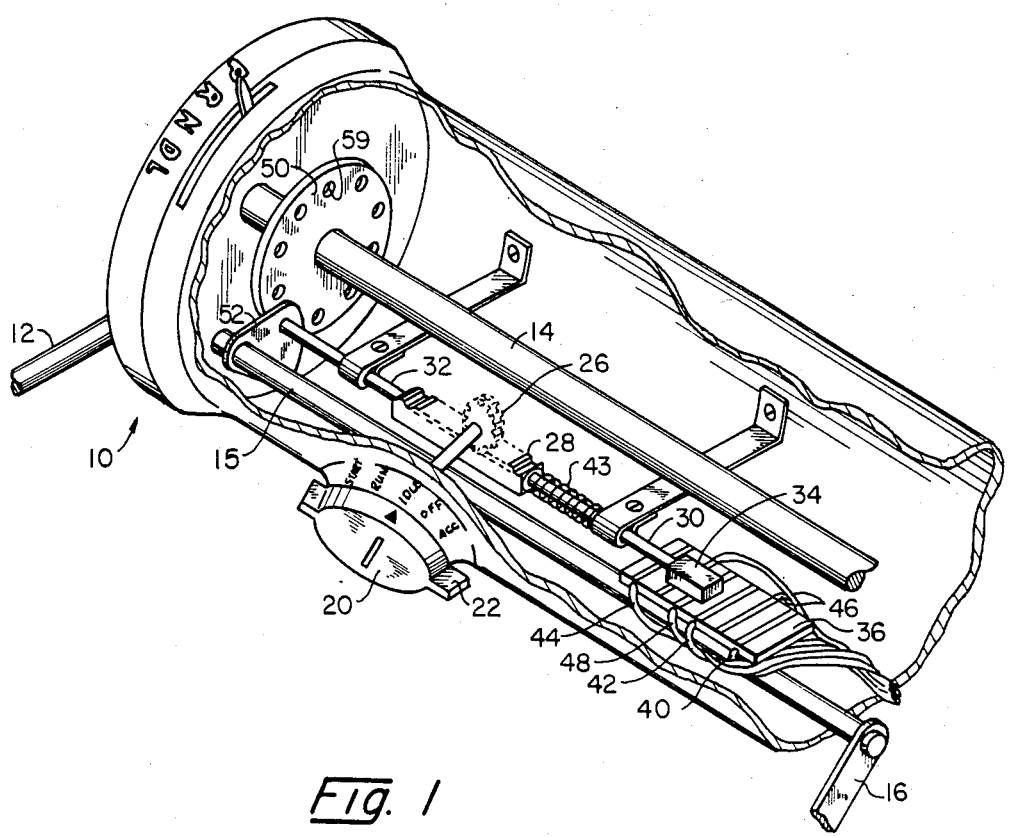
FIG. 1 is a partially broken-away perspective view of a vehicle steering column equipped with a column mounted transmission gear selection lever.

FIG. 1 discloses a steering column 10 which is similar to those normally found in motor vehicles having automatic transmissions. The steering column 10 differs from conventional steering columns in that it incorporates steering and transmission locking features which can be engaged during engine operation.

The steering column 10 includes a gear shift lever 12 and a steering shaft 14. As is common in this type of assembly, the gear shift lever is attached to a transmission control linkage which includes a shaft 15 and a bell crank 16 which connect to the transmission (not shown). The steering shaft 14 is connected to a steering wheel (not shown).

An ignition key switch 20 is positioned on the steering column 10. The ignition key switch 20 operates in a manner similar to conventional automotive ignition key switches. When a key is inserted into the ignition key switch 20, a collar 22 may be rotated to the accessory, off, idle, run, or start positions. When each of the ignition switch collar positions is aligned with the indicator 24 different wires are connected to an electrical power supply at an electrical control block 36.

Rotation of the ignition switch collar 22 rotates a pinion 26 which moves a gear rack 28 and two control shafts 30, 32, up or down. Movement of the lower control shaft 30 changes the position of a contact wiper 34 on the electrical control block 36. Electrical connections are thereby changed by movements of the contact wiper 34. The electrical connections correspond with the collar 22 positions.

Specifically, an input power line 46 is selectively connected to circuit wires 40, 42, 44, 48 through the control block 36 and wiper 34. Connection of the power line 46 to accessory circuit wire 44 supplies battery power solely to vehicle accessories while connection of the power line to run wire 42 supplies power to both the engine and the accessories. Movement of the wiper 34 to the off position disconnects electrical power from both the engine and the vehicle accessories and causes vehicle operation to cease.

The start position differs somewhat from the other control position since the ignition switch acts like a momentary contact switch when moved to the start position. Connection to the start wire 40 is made only when pressure is maintained on the rotary collar 22 and therefore the gear rack 28. A return spring 43, compressed by the rack 28, returns the rack to the run position when the rotary dial is released from the start position.

In accordance with the invention, I have added an "idle" position to the conventional ignition switch positions. The ignition key (not shown) may be removed from the ignition key switch in the idle position as well as in the off position. When the key is then removed from the ignition key switch, the collar 22 is locked in either the off or idle positions. In the idle position, power is supplied to both the engine and the accessories through circuit line 48, however, if the ignition key has been removed, the vehicle steering and transmission are locked to prevent vehicle movement.

Movement of upper control shaft 32 governs a steering and transmission lock assembly. The topmost portion of the control shaft 32 engages a hole 53 in a transmission lock plate 52 in the off, accessory and idle positions. The transmission lock plate rotates with movement of the gear shift 12 and connected shift linkage shaft 15. Therefore, hole 53 is out of position and the lock plate 52 blocks upward movement of the shaft 32 when the transmission is not in the park position. The lock plate therefore serves as a safety interlock that only allows movement of the ignition switch collar to the off or idle positions only when the transmission is in the park position. This safety interlock arrangement prevents accidental vehicle stalling and locking while the vehicle is in motion.

The steering shaft 14 is also locked from rotation, by the movement of control shaft 32. The control shaft engages one of a series of holes 59 in the steering wheel lock 50 when the transmission lock is engaged. In the idle position, therefore, power is supplied for continued engine operation while both the transmission and steering controls are locked. However, this system can still be used to lock the steering wheel.

Figure 7:
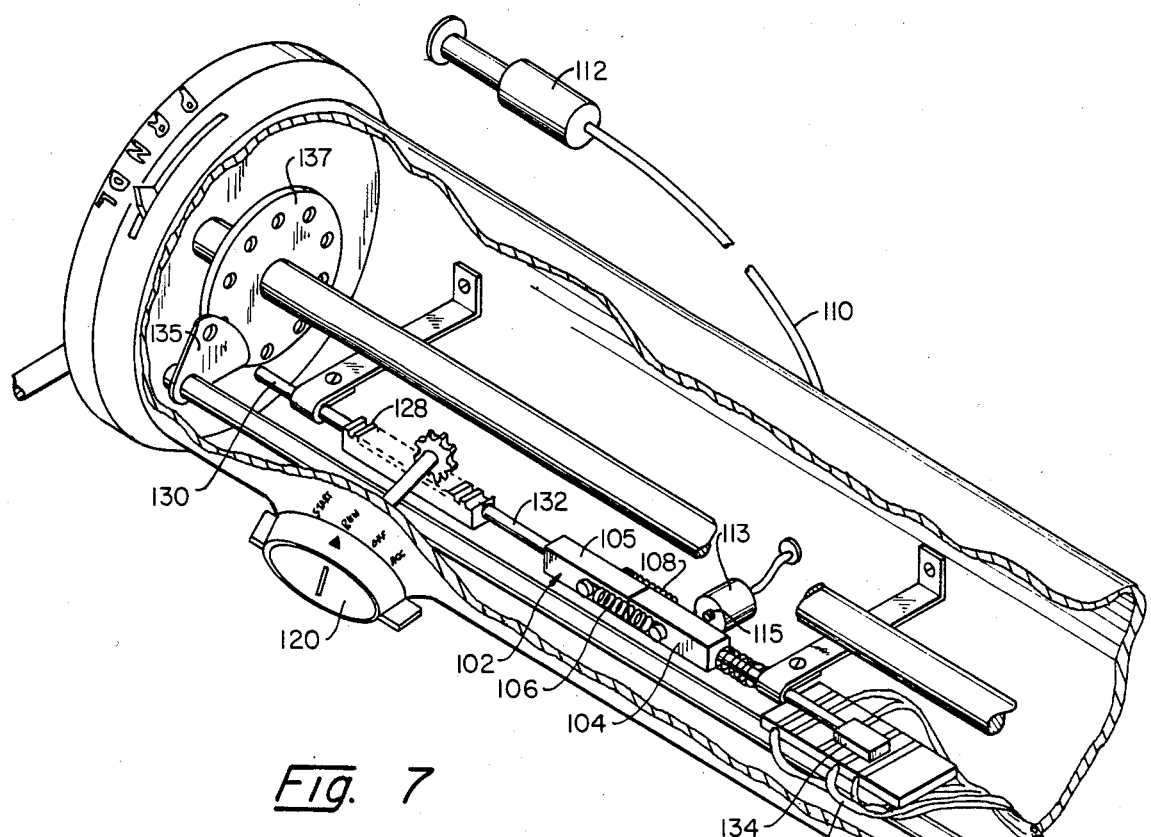
FIG. 7 is a perspective view of a pre-existing steering column which has been retrofitted with an anti-theft device incorporating principles of this invention.
Figure 8:
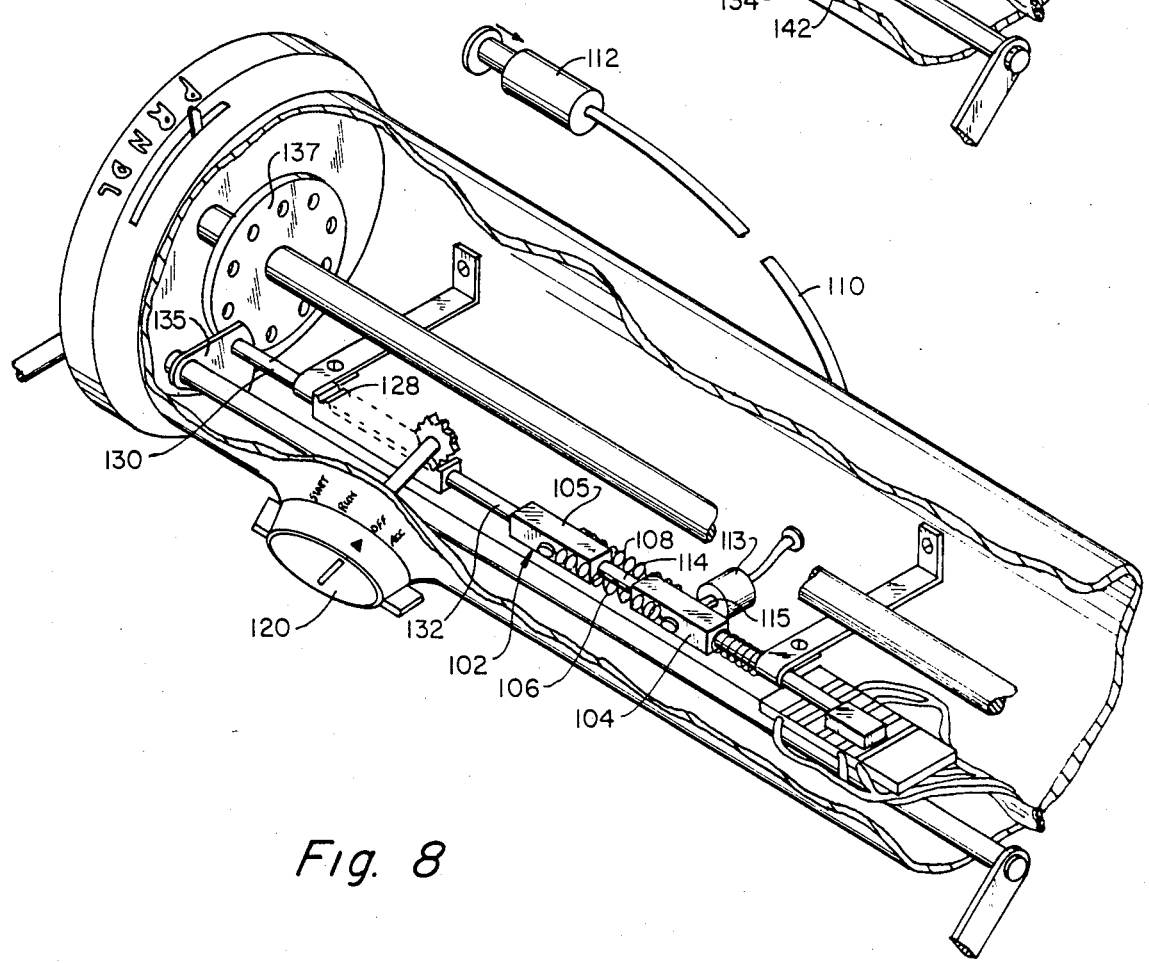
FIG. 8 is a perspective view of the anti-theft device of FIG. 7 in its activated position.

These locking features can also be installed on pre-existing vehicles. FIG. 7 and 8 disclose such an installation.

Specifically, a typical ignition control system as found in most pre-existing motor vehicles has been modified with the installation of a shaft connector assembly 102. A lower control shaft 132 has been cut between the wiper 134 and the gear rack 128 to permit installation of the connector assembly 102.

The shaft connector 102 is shown in its closed position in FIG. 7. In this position springs 106 and 108 hold connector halves 104 and 105 tightly together. As a result the vehicle ignition control switch operates normally, which is to say identically with an unmodified ignition control switch. The transmission and steering assemblies are, therefore, locked only when the switch is moved to the off position.

In order to lock the vehicle with its engine running control knob 112 is depressed with the ignition in the run position. This forces a cable 110 to extend pin 115 at base 113. The pin locks the connector base 104 in the run position. The base 104 and lower part of control shaft 132 therefore do not move with movement of the ignition switch to the off position. This causes the electric wiper 134 to remain at the run wire 142 and continue to supply power to the engine when upper control shaft 130 is moved to lock the transmission and the steering through locking plates 135 and 137 (FIG. 8). As a result, engine operation continues while the steering wheel is locked from movement and the transmission is locked in the park position.

When the control knob 112 is retracted, pin 115 retracts and springs 106 and 108 snap the two connector halves 104 and 105 together. Wiper 134 is thereby moved to the off position. The control knob 112 may therefore be freely accessible in the vehicle since a prospective thief could only stall the engine by moving the knob.

The lower shaft 114 may alternatively be controlled by a linear solenoid positioned in locking base 113 and an electric switch replacing knob 112.

The ability to lock both the vehicle steering and the transmission assemblies while the engine is operating, permits temporary departures from a running vehicle without fear of vehicle theft. This exact arrangement, however, cannot be used for vehicles equipped with manual transmissions or floor mounted automatic transmission controls. Furthermore, additional security arrangements are sometimes required.

An additional element of the invention consists of an electric ground out system which provides added security for unattended operating vehicles. The ground out system causes engine stalling if unauthorized movement of the vehicle is attempted. The ground out system may be used with or without the mechanical locking devices described above. The ground out system, however, cannot be engaged while the vehicle is in motion and therefore it promotes security without creating a potential safety hazard.

Figure 6:
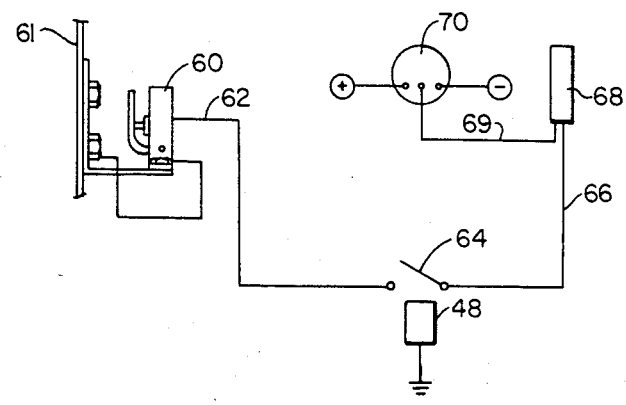
FIG. 6 is a circuit diagram of a vehicle anti-theft system.

A circuit diagram of the anti-theft ground out system is shown in the schematic of FIG. 6. A required ground out anti-theft system activation switch 64 can be either a manual switch, a normally closed relay switch, or the normally open relay switch 64 shown in FIG. 6. The normally open relay switch 64 is controlled by the ignition key switch position. When the ignition switch 20 is in the idle position current is supplied to the anti-theft activation switch 64 through wire 48 at the control block 36 (FIG. 1). This current causes the relay switch to close and activate the electric anti-theft system.

Alternatively, to further insure against theft, a normally closed anti-theft actuation switch (which replaces switch 64) can be provided. With a normally closed switch, the ignition lock system is wired to supply current to the activation switch when the ignition key switch is in the run and start positions. This may be done by means of a secondary contact block mounted on the ignition key switch. The activation switch is thus powered during normal transmission operation but not when the collar is in the idle position. Therefore, removal of the ignition key switch interrupts the activation switch's current supply, closes the switch and activates the anti-theft system. This embodiment makes it more difficult for a thief to bypass the anti-theft system by damaging the ignition key switch.

When the ground out system is installed on pre-existing vehicles a manual single pole switch replaces switch 64 and is used as the anti-theft system activation switch, since no idle position exists on conventional ignition key switches. The manual anti-theft system activation switch is set and reset by a vehicle operator upon leaving and re-entering an unattended vehicle. In order to prove worthwhile for avoiding theft, the switch must either be hidden from view, in a location known only to the vehicle operator, or require a key for deactivation. Hiding the switch is easily accomplished during kit installation, since the switch can be placed anywhere in the vehicle.

A ground out switch 60 is connected at a first pole to a surface 61 having ground potential, e.g., the engine block on the transmission housing. A second pole 62 of switch 60 is electrically connected to the anti-theft system activation switch 64 and through switch 64 may be connected by wires 66 and 69 to diodes 68 and the vehicle ignition 70.

The ground out switch 60 may be positioned as is most convenient depending on the design of a particular vehicle. In automatic transmission automobiles, the ground out switch is readily connected to the transmission shift linkage.

Figure 2:
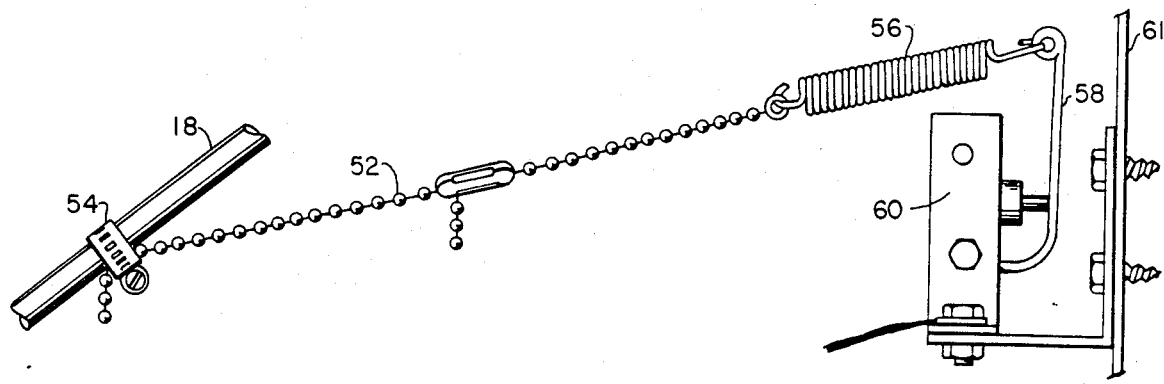
FIG. 2 is a plan view of a connection between a transmission gear selection linkage and a ground out switch.

Still referring to automatic transmission vehicles, a transmission linkage shaft 18, as shown in the expanded view of FIG. 2, is connected to switch 60 by a band clamp 54, a chain link 52 and spring 56. The chain link is at minimum tension when the transmission gear shift is in the park position. When the transmission gear shift is forcibly moved by an operator to another position, using the shift lever 12 (FIG. 1), linkage 18 draws the chain link 52 taut and thereby exerts a force on spring 56 and lever 58. The force exerted by the chain link 52 closes the normally open ground out switch 60. Completion of this circuit (FIG. 6) directly connects the vehicle's ignition system 70 to ground 61 and thereby causes the engine to stall.

A safety consideration that should be noted is that the ground out system is active only when the ignition switch is in the idle position which is only available when the transmission is in the park position. This interlock feature prevents accidental engine stalls while the vehicle is in motion.

Modern electronic ignition systems which use high voltages are particularly sensitive to grounding and must be properly shielded. Therefore, a voltage limiting ballast resistor or diode 68 (FIG. 6) is used to protect the ignition system 70 from damage due to the large voltage changes caused by a direct connection to ground. Lead 66 from the anti-theft actuation switch is therefore connected to two series diodes 68 or a ballast resistor.

Vehicles equipped with the automatic transmission shift on the steering column shown in FIG. 1, may also be constructed with an integral ground out switch 80, (FIG. 5), which replaces switch 60 (FIG. 6). A transmission shaft 81 similar to shaft 15 (FIG. 1), is rotated when a vehicle operator changes the transmission shift lever 12 position. The shaft is of sufficient diameter to depress (close) a normally open ground out switch 80 at each transmission position except for the park position where the switch is open. As a result, movement of the transmission out of the park position closes the switch, completes the circuit and disables the vehicle when the anti-theft system is activated.

Figure 3:
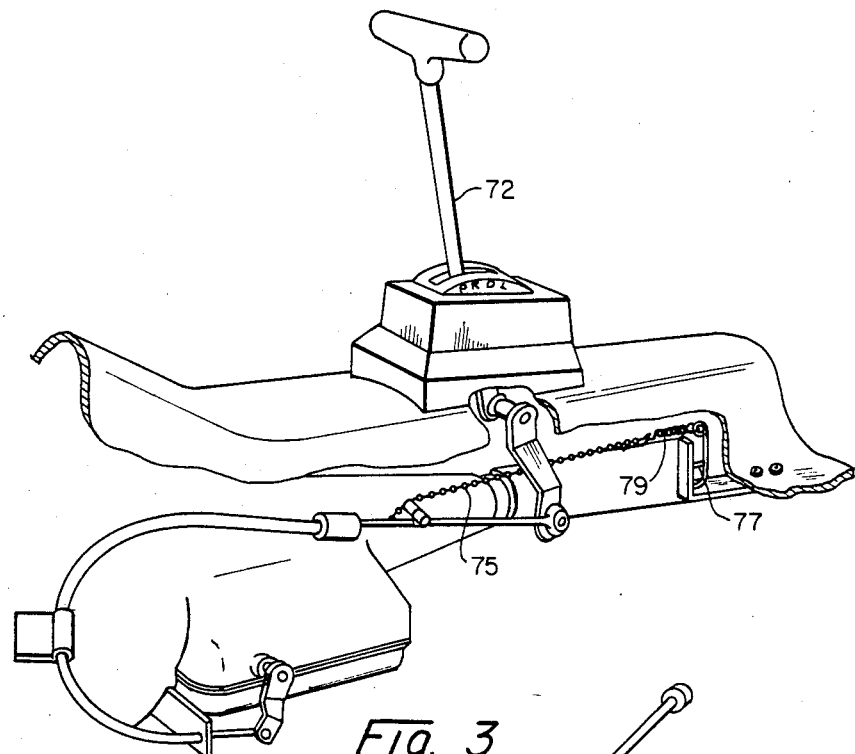
FIG. 3 is a perspective view of a floor-mounted transmission gear selection lever and a ground out switch.

A typical ground out switch mounting for vehicles with a floor mounted automatic transmission gear selector lever is shown in FIG. 3. In the figure the gear selector is in the park position and a ground out switch 77, which replaces swifch 60 of FIG. 6, is in its open position. When the selector lever 72 is moved to reverse, drive, or low, chain 75 and spring 79 are drawn taut, to close ground out switch 77. This completes the ground out circuit whenever the anti-theft system is activated (i.e., the ignition switch is in idle position).

Figure 4:
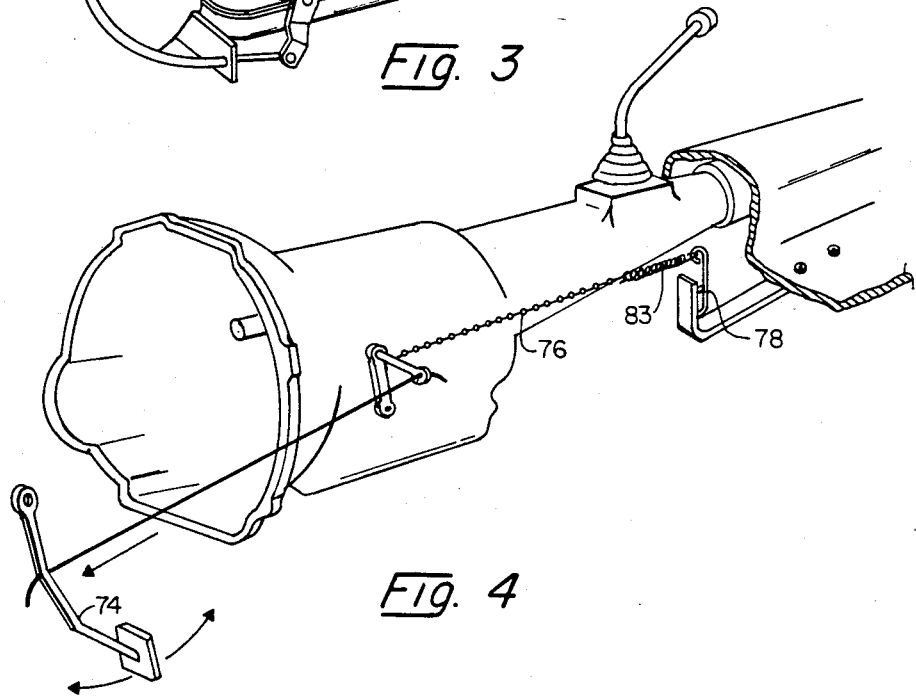
FIG. 4 is a perspective view of a transmission clutch control linkage and a ground out switch.

FIG. 4 shows a ground out switch arrangement for manual transmission automobiles. It is necessary to depress a clutch control pedal 74 in order to engage and disengage a manual transmission. Therefore, ground out switch 78, which replaces switch 60 of FIG. 6, chain 76 and spring 83 are directly mounted on the clutch pedal linkage so that movement of the clutch pedal 74 draws the chain 76 taut and closes ground out switch 78. Clutch pedal depression grounds out the ignition system when the anti-theft system is activated. An additional safety feature which is required on manual cars is an ignition switch collar lock button similar to those already used on such vehicles. This feature prevents movement of the collar to the idle or off positions without the depression of the release button, and therefore prevents inadvertent vehicle stalling.

Figure 9:
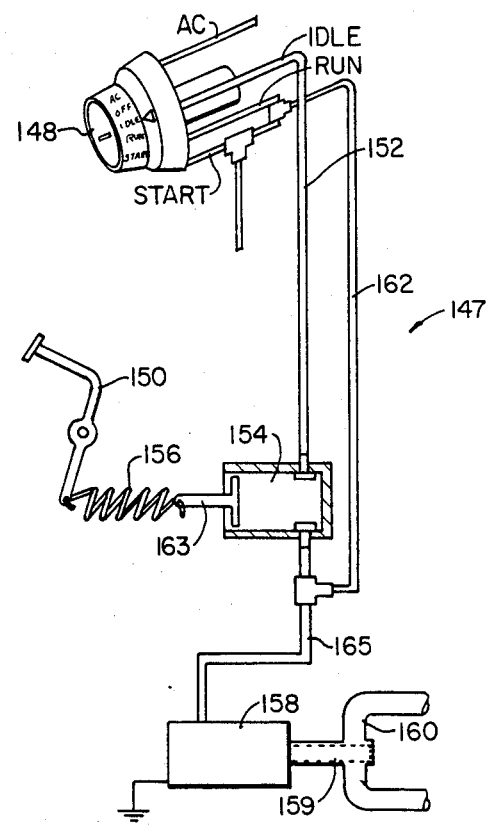
FIG. 9 is a schematic representation of an electric anti-theft system for diesel vehicles.

FIG. 9 shows an electric anti-theft system 147 suitable for diesel vehicles which is similar to the electric ground-out system described above. Diesel cycle engines do not use the electric ignition systems typically used in gasoline engines, rather they rely on auto-combustion of fuel due to high pressure compression in the engine cylinders. Diesel vehicles, therefore, cannot be electrically grounded out. Instead the engine's fuel supply must be interrupted to shut off the engine.

The diesel anti-theft system 147 therefore differs from the ground-out system in that the idle position wire 152 supplies power to a cut out switch 154 when the ignition switch 148 is in the idle position. The cut out switch 154 is mounted at the vehicle clutch 150 through spring 156. When the clutch is at rest (engaged) the shut off switch is closed and thereby completes a circuit through wire 165 to the fuel shut off solenoid 158. The energized fuel shut off solenoid opens valve 159 and allows fuel to flow through fuel line 160. It should be noted that when the ignition switch 148 is in the run position the run wire 162 supplies power directly to the fuel shut off solenoid to permit engine starting and normal driving.

If the clutch is depressed while the ignition is in the idle position spring 156 moves a contact 163 at cut off switch 154 which electrically disconnects the fuel shut off solenoid from idle power supply wire 152. When the fuel shut solenoid is deactivated it snaps closed (as in FIG. 9) and interrupts the fuel supply to the engine. Therefore, any attempt to engage the vehicle transmission when the ignition switch 148 is locked in the idle position stalls the vehicle. Restarting of the vehicle after an idle stall is impossible without a key.

Figure 5:
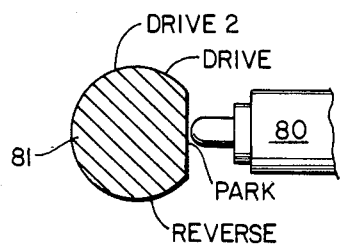
FIG. 5 is a cross-sectional view of a transmission gear selection linkage member and an integral ground out switch.

Diesel vehicles with automatic transmission can have the cut off switch 154 mounted similarly to the ground out switches of FIGS. 2, 3 and 5. The fuel cut out switch should be, however, normally closed rather than normally open as shown for switch 60 (FIG. 6). As a result movement of an automatic transmission shift away from park would serve to interrupt fuel flow.

Figure 10:
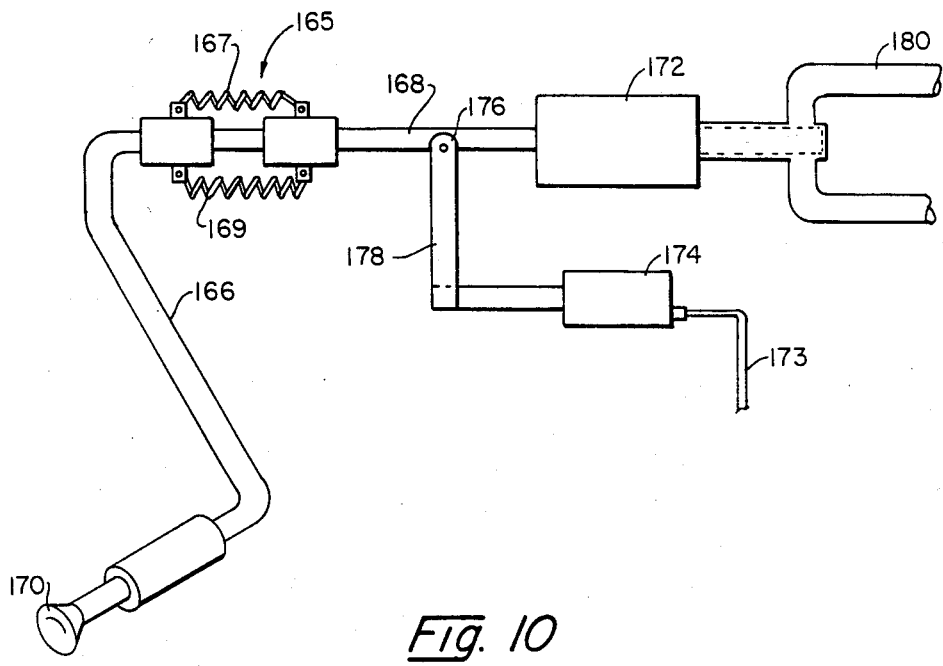
FIG. 10 is a plan view of an electric anti-theft system for diesel vehicles with a mechanical fuel shut off valve.

FIG. 10 shows a method of adapting the diesel anti-theft system for use with a mechanical fuel shut-off valve 172 as found in some vehicles. Shaft connector 165 and springs 167, 169 normally hold cable halves 166 and 168 together, as a result fuel is supplied to the engine when fuel control knob 170 is pulled out. When the knob is pushed in the fuel flow through line 180 is interrupted by fuel valve 172 and the engine is shut off. A solenoid 174 can be attached through a bracket 176 to cable half 168. The solenoid is connected by wire 173 to a clutch activated switch (not shown) identical to the normally open switch 78 of FIG. 4 and connected to a power supply when the ignition is in the idle position. Depression of the clutch while the ignition is in the idle position closes the clutch switch and thereby energizes solenoid 174 which pulls in arm 178. As a result cable half 168 moves and valve 172 closes to cut off the fuel flow through fuel line 180 as shown in FIG. 10. This results in engine shut off.

While the invention has been particularly shown and described with reference to preferred embodiments thereof, it will be understood by those skilled in the art that various changes of form and details may be made therein without departing from spirit or scope of the invention as described in the appended claims. For example, various minor modifications of the invention are required to adapt it to the wide variety of commercial and private vehicles currently in use.

What is claimed as new and desired to be secured by Letters Patent of the United States is:

1. An anti-theft system for a motor vehicle in which the motor vehicle comprsises an engine, drive means selectively connected to said engine, a vehicle control means including a transmission control mechanism for selectively connecting said drive means to said engine and a steering control mechanism for steering the vehicle when the drive means is connected to the engine, and a key operated ignition control switch for controlling electrical ignition and accessories circuits, the anti-theft system comprising:

a locking mechanism associated with the ignition control switch for mechanically locking at least one of said control mechanisms for rendering the vehicle nonoperational;

said ignition control switch having a plurality of positions including an off position, idle position, and a run position;

said locking mechanism being actuated when said ignition switch is in either said off position or said idle position and said locking mechanism being deactivated when said ignition switch is in said run position; and wherein said ignition key may be removed when said ignition switch is in said idle position for providing power to the ignition circuit of the engine such that the engine may be operated with at least one of said control mechanisms being rendered nonoperational.

2. An anti-theft system as claimed in claim 1 wherein said locked control mechanism is the steering control mechanism.

3. An anti-theft system as claimed in claim 2 wherein the transmission control mechanism is locked with the steering control mechanism.

4. An anti-theft system as claimed in claim 1 wherein said locked control mechanism is the transmission control mechanism.

5. An anti-theft system as claimed in claim 1 further comprising an additional switch for preventing further ignition of the engine with attempted operation of the vehicle.

6. An anti-theft system as claimed in claim 5 wherein the additional switch completes a circuit path between ground and the electrical ignition circuit with unauthorized operation of the vehicle.

7. An anti-theft system as claimed in claim 6 wherein the additional switch completes the circuit path to ground when the transmission control mechanism is set to connect the drive means with the engine.

8. An anti-theft system as claimed in claim 6 wherein the additional switch completes the circuit path to ground in response to operation of a transmission clutch.

9. An anti-theft system as claimed in claim 5 wherein the additional switch shuts off flow of fuel to the engine with unauthorized operation of the vehicle.

10. An anti-theft system as claimed in claim 1 further comprising an additional switch for preventing further ignition of the engine with attempted operation of the vehicle.

11. An anti-theft system as claimed in claim 10 wherein the additional switch completes a circuit path between ground and the electrical ignition cirucit with unauthorized operation of the vehicle.

12. An anti-theft system as claimed in claim 11 wherein the additional switch completes the circuit path to ground when the transmission control mechanism is set to connect the drive means with the engine.

13. An anti-theft system as claimed in claim 11 wherein the additional switch completes the circuit path to ground in response to operation of a transmission clutch.

14. An anti-theft system as claimed in claim 10 wherein the additional switch shuts off flow of fuel to the engine with unauthorized operation of the vehicle.

* * * * *